(12) United States Patent
Kobayashi et al.

(10) Patent No.: US 6,698,901 B2
(45) Date of Patent: Mar. 2, 2004

(54) IMAGE FORMING SYSTEM AND OPTICAL SCREEN UNIT

(75) Inventors: Hiroyoshi Kobayashi, Hachioji (JP); Kazuya Yamanaka, Hachioji (JP); Masakatsu Ohuchi, Ebina (JP); Isao Doshida, Yokohama (JP)

(73) Assignee: Olympus Optical Co., Ltd., Tokyo (JP)

( * ) Notice: Subject to any disclaimer, the term of this patent is extended or adjusted under 35 U.S.C. 154(b) by 17 days.

(21) Appl. No.: 10/025,281

(22) Filed: Dec. 19, 2001

(65) Prior Publication Data

US 2002/0122249 A1 Sep. 5, 2002

(30) Foreign Application Priority Data

Dec. 25, 2000 (JP) ........................................ 2000-393114

(51) Int. Cl.$^7$ .............................................. G03B 21/14
(52) U.S. Cl. ........................................ 353/94; 359/456
(58) Field of Search ........................... 353/30, 94, 122; 359/449, 451, 460, 456, 457

(56) References Cited

U.S. PATENT DOCUMENTS

| | | | |
|---|---|---|---|
| 4,895,429 A | * | 1/1990 | Iwahara et al. ............. 359/460 |
| 5,011,277 A | * | 4/1991 | Ogino et al. ................... 353/94 |
| 5,085,495 A | * | 2/1992 | Iwahara et al. ............. 359/455 |
| 5,185,677 A | * | 2/1993 | Honda et al. ................ 359/460 |
| 5,200,854 A | * | 4/1993 | Ogino et al. ................. 359/451 |
| 5,206,760 A | * | 4/1993 | Nakashima et al. ......... 359/457 |
| 5,708,528 A | * | 1/1998 | Furuya ........................ 359/457 |

FOREIGN PATENT DOCUMENTS

JP 7-043835 A 2/1995

* cited by examiner

*Primary Examiner*—William Dowling
(74) *Attorney, Agent, or Firm*—Frishauf, Holtz, Goodman & Chick, P.C.

(57) ABSTRACT

An image forming system is provided which includes an optical sheet and an image projector. The optical sheet is constructed by joining a plurality of sheet members with adjoining sheet members meeting to form a joint line. The image projector produces an image and projects the image to the optical sheet through a projection optical system. The relative positional relationship between the image projector and optical sheet is such that the optical axis of the projection optical system included in the image projector perpendicularly intersects the joint line in the optical sheet. Thus, reflection or scattering of light at the joint line is minimized.

6 Claims, 10 Drawing Sheets

IMAGE FORMING SYSTEM AND OPTICAL SCREEN UNIT

This application claims the benefit of Japanese Application No. 2000-393114 filed in Japan on Dec. 25, 2000, the contents of which are, incorporated by this reference.

BACKGROUND OF THE INVENTION

1. Field of the Invention

The present invention relates to an image forming system and an optical screen unit. More particularly, the present invention is concerned with an optical screen unit having a major surface on which an image is projected, and with an image forming system.

2. Description of the Related Art

In the past, various proposals have been made on an optical screen unit having a major surface on which an image is projected from an image projector.

As such an optical screen unit, for example, Japanese Unexamined Patent Application Publication No. 7-43835 describes a translucent projection screen having a plurality of screen sheets arranged into an image projection surface of the screen. The translucent projection screen includes holding means that holds at least one joint portion between screen sheets. At this time, the holding means restricts movement of the joint portion so that the joint portion will be immovable in a direction substantially orthogonal to the joint portion but movable in a direction substantially parallel thereto. Thus, the displacement of the joint portion is minimized.

Furthermore, the translucent projection screen includes tensioning means that tensions each screen sheet to move towards edges of the image projection surface and that is provided in an ineffective part of each screen sheet, that is, the perimeter of each screen sheet on which no image is projected. The inclusion of the tensioning means eliminates a warp or deflection.

In order to efficiently introduce projected light to an observer, the screen of the optical screen unit is designed in various forms. For example, the screen is realized by arranging numerous beads into a plane, shaping a Fresnel lens sheet, or using lenticular lens sheets. Generally, an optical member having a diffusing surface is adopted in combination with the screen designed in any of the forms in order to realize a wide angle of visibility.

By the way, in a multi-projector system having a plurality of image-projectors arranged, a plurality of partial images are projected from the plurality of image projectors in order to form one image on a screen. A streak between partial images is discernible by an observer who sees the screen while staying in front of the system but may be discerned by an observer who sees the screen while staying obliquely to the system. Nevertheless, the optical screen unit designed in any of the foregoing forms is helpful in alleviating the problem.

Assume that the image projectors arranged without any measures taken may project images on a optical screen that has a seam (joint line) between screen sheets like the one described in the Japanese Unexamined Application Publication No. 7-43835. In this case, the seam may be discerned as a streak in a displayed image. This deteriorates images quality.

Moreover, even in the aforesaid optical screen unit for example, when the screen is realized with lenticular lens sheets, the lenticular lens sheets oriented in two directions must be superposed on each other for the purpose of obtaining a two-dimensional effect. Furthermore, in order to sharply display an image formed on the lenticular lens sheets without blurring the image, the lenticular lens sheets must be brought into close-contact with the optical member having the diffusing surface.

There is therefore an increasing demand for the technology for bringing optical sheets such as the lenticular lens sheets into close contact with the optical member having the diffusing surface such as an optical plate without occurrence of a warp or deflection.

SUMMARY OF THE INVENTION

Accordingly, an object of the present invention is to provide an image forming system in which streaks stemming from joint lines will be indiscernible in an image projected on an optical sheet having joint lines.

Another object of the present invention is to provide an optical screen unit whose optical sheet can be brought into close contact with an optical plate thereof without impairment of the sharpness of an image formed on the optical sheet.

Briefly, according to the present invention, there is provided an image forming system consisting mainly of fan optical sheet and image projectors. The optical sheet has a plurality of sheet members joined with the margins of adjoining sheet members met as a joint line so as to have one or more joint lines. The image projectors each produce an image or a part of an image and project the image or part of an image to the optical sheet through a projection optical system. Herein, when the joint lines do not cross each other in the optical sheet, the number of image projectors is equal to or larger than the number of joint lines. When the joint lines cross each other at a node, the number of image projectors is equal to or larger than the number of nodes. The image projectors are positioned to cope with any of three cases described below. Namely, in the first case, only one node exists within a field in the optical sheet on which an image projector projects an image or part of an image. In the second case, no node exists but only one joint line exists. In the third case, no joint line exists. Moreover, in the first case, the optical axis of a projection optical system included in an image, projector meets the node so as to fit the normal on the major surface of the optical sheet. In the second case, the optical axis of a projection optical system included in an image projector intersects the joint line at a point, and is contained in a plane defined with the normal on the major surface of thee optical sheet at the point and with the point on the joint line.

Moreover, according to the present invention, there is provided an image forming system consisting mainly of and optical sheet and an image projector. The optical sheet has a unique portion whose optical property is unique. The image projector projects an image on the optical sheet through a projection optical system. The image projector is positioned so that a solid angle formed with rays propagating from the projection optical system to the unique portion will be minimized under a restriction on a predetermined positional relationship to the optical sheet.

Furthermore, according to the present invention, there is provided an optical screen unit that has an image projected on the major surface thereof. The optical screen unit consists mainly of an optical plate, one or more optical sheets, and a close contact means. The optical plate has rigidity. The one or more optical sheets are arranged over the major surface of the optical plate and have flexibility. The close contact means brings the major surface of the optical plate and the major surfaces of the optical sheets into close contact with one another.

The above and other objects, features, and advantages of the invention will be more clearly understood from the following description referring to the accompanying drawings.

DETAILED DESCRIPTION OF THE PREFERRED EMBODIMENTS

Various embodiments of the present invention will be described with reference to the drawings below.

Figure 1:
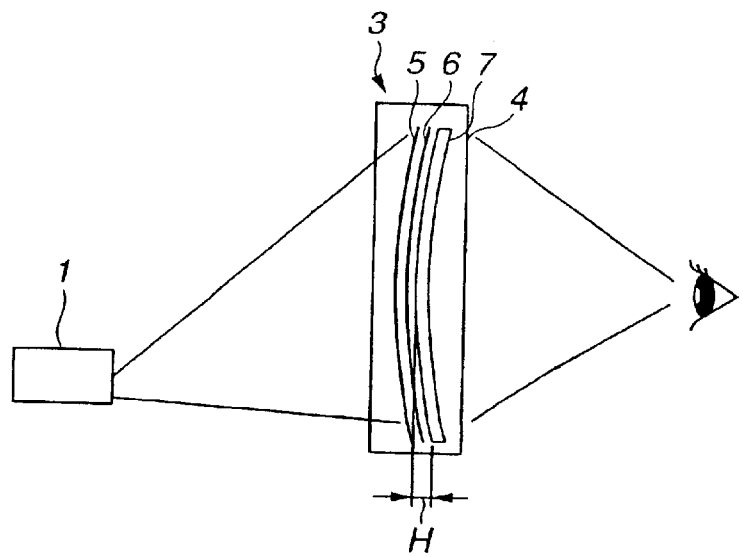
FIG. 1 is a side view showing the structure of an optical screen unit, on which an image is projected from an image projector, employed in an embodiment of the present invention.
Figure 2:
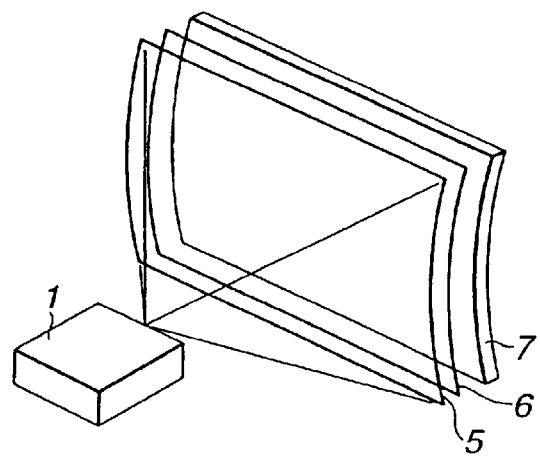
FIG. 2 is a perspective view showing the arrangement of optical sheets and an optical plate which are included in the optical screen unit, on which an image is projected from an image projector, employed in the embodiment.

According to a first embodiment, an image is, as shown in FIG. 1 and FIG. 2, projected from an image projector 1 on the major surface of an optical screen unit 3. The optical screen unit 3 has an optical plate 7 and, for example, two optical sheets 5 and 6 supported on a frame member 4. The optical plate 7, which is rigid, is located on the side of the frame member 4 facing an observer. The two optical sheets 5 and 6, which are flexible, are brought into close contact with each other over the major surface of the optical plate 7.

The optical plate 7 is formed with an acrylic plate or the like having a predetermined thickness. The optical plate 7 is rigid enough to hold the curved surface intact with the optical sheets 5 and 6 tensed and brought into close contact with each other.

Moreover, the optical sheets 5 and 6 are realized with, for example, lenticular lens sheets. The optical sheets 5 and 6 are arranged so that the direction of the lenticular lens sheet serving as the optical sheet 5 will be orthogonal to the direction of the lenticular lens sheet serving as the optical sheet 6.

In order to form the optical screen unit 3 having a large screen a large are a lenticular lens sheet is needed. Generally the lenticular lens sheet is formed by pressing a transparent resin material, which has been heated and softened, using a roller member having a female mold inscribed on the periphery thereof. Considerable pressure must therefore be applied in order to realize a thin lenticular lens sheet. When the lenticular lens sheet must be wide enough while being thin enough, required pressure is so intense that the rigidity of a manufacturing machine must be improved markedly. This leads to the high cost of a manufacturing. A technology of joining lenticular lens sheets of a predetermined width to form a large area lenticular lens sheet has been developed accordingly.

Figure 3A:
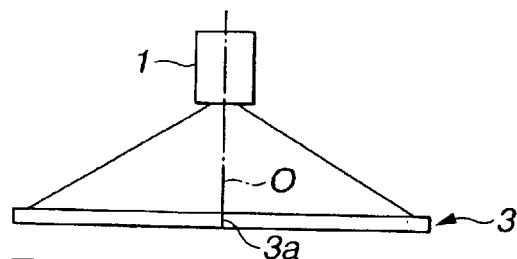
FIG. 3A and FIG. 3B are a plan view and a front view showing the relationship between a joint line in the optical screen unit employed in the embodiment and, the optical axis of the image projector.
Figure 3B:
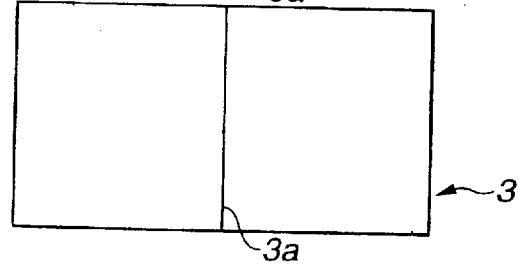

For example, a joint line 3a in the optical screen unit 3 shown in FIG. 3A and FIG. 3B is caused by joining of the lenticular lens sheets. The optical screen unit 3 is designed so that the optical axis O of a projection optical system included in the image projector 1 will intersect the joint line 3a.

Owing to the design, light radiated from the image projector 1 falls on the optical screen unit nearly perpendicularly to the joint line 3a. Compared with a case where light falls thereon obliquely thereto, the joint line, 3a is indiscernible.

In the case of an optical screen having three or more optical screens joined, the optical axis O of the projection optical system included in the image projector 1 should preferably intersect at least one joint line.

Moreover, in the case of a multi-projector system in which a plurality off image projectors project partial images, the optical axis O of a projection optical system included in any of the image projectors should intersect a joint line.

The optical screens 5 and 6 to which tensile force is applied is pressed against the optical plate 7 and thus brought into close contact therewith. The major surface of the optical plate 7 is curved to be convex towards the optical screens 5 and 6.

At this time, the convex surface should preferably be equivalent to a flat two-dimensional space. Namely, when for example, a cylindrical surface that is equivalent to a flat two-dimensional space is developed, it will fit a plane However, when, for example, a spherical surface that is equivalent to a bent, two-dimensional space is developed, it will not fit a plane. When the convex surface is a spherical surface, a bend or distortion will be produced somewhere on the optical screens 5 and 6.

The major surface of the optical plate 7 is, as shown in FIG. 2 and others, formed as (part of) a cylindrical surface.

Specifically, when no stress is applied to the optical plate 7, a maximum magnitude of projection of the major surface of the optical plate 7 that is a convex surface ranges 2 mm to 100 mm. More particularly the maximum magnitude of projection is set to an optimal value depending on a screen size and a material made into the optical sheets.

The reason why the above restriction is imposed will be described. Namely, when a magnitude of projection is too small intense tensile force must be applied order to bring the optical screens 5 and 6 into close contact with the optical plate. The frame member 4 must be so rigid as to withstand the tensile force. This leads to an increase in the weight of the optical screen unit 3. In contrast, if the magnitude of projection is too large, the optical screens 5 and 6 are devoid of flatness and recognized as curved surfaces.

Figure 4:
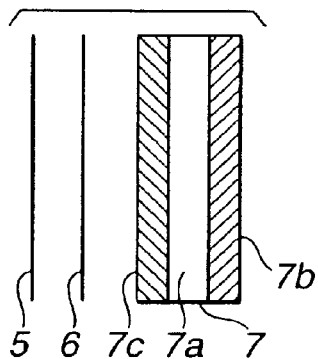
FIG. 4 is an enlarged view showing the arrangement of the optical sheets and the optical plate, which are employed in the embodiment, in a direction in which they are layered.

The optical plate 7 has a substrate 7a made of an acrylic. As shown in FIG. 4, one of both sides of the substrate 7a facing the optical sheets 5 and 6 is formed as a diffusing surface 7c. The other side facing an observer is formed as an optical surface 7b that has been processed to become anti-glare or anti-reflection.

The optical plate 7 is thus formed as a diffusing plate because an image formed on the optical sheets 5 and 6 can be viewed with a wide angle of visibility ensured. When the optical plate 7 is distanced from the optical sheets 5 and 6, an image formed on the optical sheets 5 and 6 blurs. Therefore, the optical sheets 5 and 6 are as mentioned above, brought into close contact with the optical plate 7.

Next referring to FIG. 5A and FIG. 5B, a description will be made on a first example of a structure for bringing the optical sheets 5 and 6 into close contact with the optical plate 7 by applying tensile force to the optical sheets.

The optical plate 7 is fixed to and supported on the frame member 4 by means of an appropriate supporting structure.

The optical sheets 5, and 6 have supporting pieces 11 attached to the four corners thereof respectively. One end of an resilient member 12 that is close contact means and also serves as tensing means is fixed to each of the four supporting pieces 11. The resilient member 12 is formed with, for example, a helical tension spring.

Figure 5A:
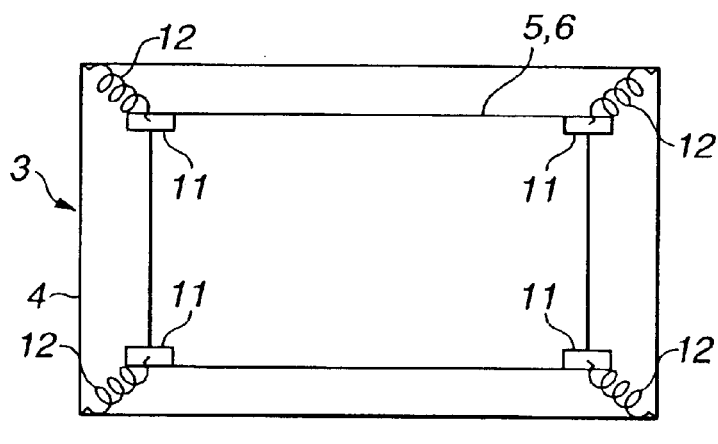
FIG. 5A and FIG. 5B are a front view and a side view showing a first example of a structure for resiliently supporting the optical sheets on a frame member employed in the embodiment.

The other ends of the resilient members 12 are, as shown in FIG. 5A, are fixed to the four corners of the inner surface of the frame member 4 respectively. More particularly, as shown in, FIG. 5B, the other ends of the resilient members 12 are fixed to the corners of the inner surface of the side of the frame member facing an observer so that pressing force will be oriented towards the optical plate 7.

In the first example, the two optical sheets 5 and 6 are mutually independently tensed by the plurality of resilient members 12. Tensile force applied to each of the optical sheets 5 and 6 is oriented in the same direction.

Owing to the structure, the optical sheets 5 and 6 can be brought into close contact with the optical plate 7 without production of a bend or distortion.

Next, referring to FIG. 6A and FIG. 6B a description will be made on a second example of the structure for bringing the optical sheets 5 and 6 into close contact with the optical plate 7 by applying tensile force to the optical sheets.

As mentioned above, the optical plate 7 is fixed to and supported on the frame member 4 by means of an appropriate supporting structure.

Figure 6A:
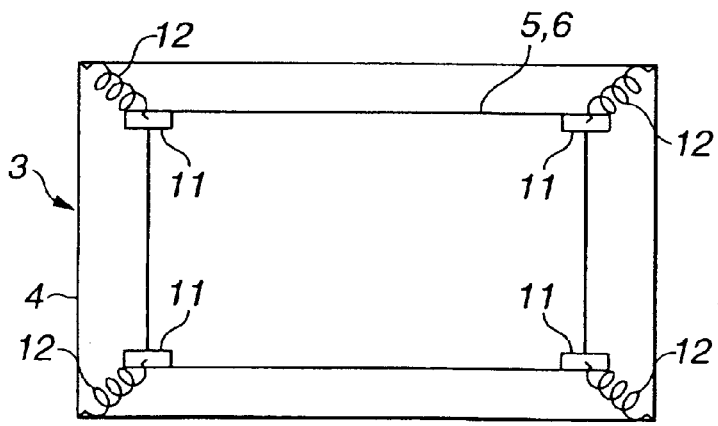
FIG. 6A and FIG. 6B are a front view and a side view showing a second example of the structure for resiliently supporting the optical sheets on the frame member employed in the embodiment.

Moreover, as shown in FIG. 6A, supporting pieces 11 are fixed to the four corners of each of the optical sheets 5 and 6. One end of a resilient member 12 that is, for example, a helical tension spring is fixed to each of the supporting pieces 11. The other ends of the resilient members 12 are fixed to the four corners of the inner surface of the frame member 4.

Figure 6B:
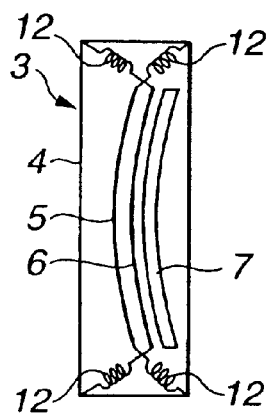

As shown in FIG. 6B however, the other ends of the resilient members 12 attached to the optical sheet 5 are fixed to the corners of the side of the frame member 4 facing an observer so that pressing force will be oriented towards the optical plate 7. The other ends of the resilient members 12 attached to the optical sheet 6 are fixed to the corners of the side of the frame member 4 facing the image projector 1 so that pressing force will be oriented towards the optical sheet 5.

Consequently, the magnitude of close contact between the optical sheets 5 and 6 can be improved. Since the optical sheets 5 and 6 must be brought into close contact with the optical plate 7, constraining force exerted by the resilient members 12 attached to the optical sheet 5 is made larger than the one exerted by the resilient members 12 attached to the optical sheet 6.

Herein, the two optical sheets 5 and 6 are brought into close contact with the optical plate 7. Generally, a plurality of optical sheets are brought into close contact with the optical plate. In this case, tensile force applied to at least one of the optical sheets except the one located farthest from the optical plate 7 may have a component oriented to recede from the optical plate 7. At this time, tensile force applied to the farthest optical sheet must have a component oriented to approach the optical plate 7. The resultant force of tensile forces applied to the plurality of optical sheets must have a component oriented to approach the optical plate 7.

Figure 7A:
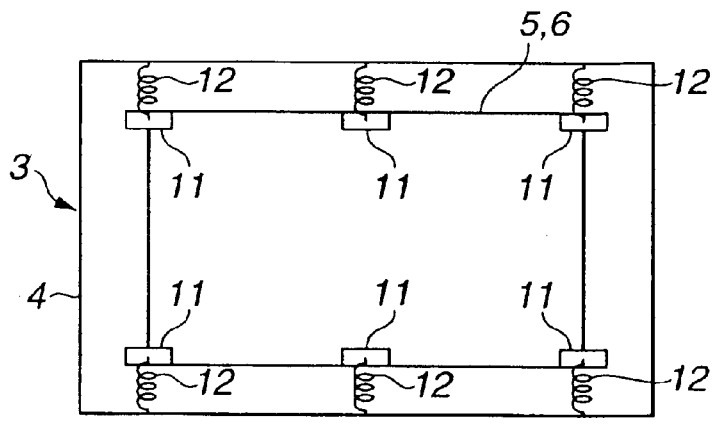
FIG. 7A and FIG. 7B are a front view and a side view showing a third example of the structure for resiliently supporting the optical sheets on the frame member, employed in the embodiment.
Figure 7B:
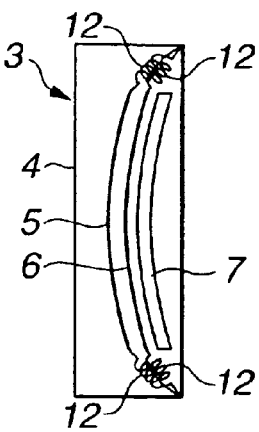

Referring to FIG. 7A and FIG. 7B, a description will be made on a third example of the structure for bringing the optical sheets 5 and 6 into close contact with the optical plate 7 by applying tensile force to the optical sheets.

As mentioned above, the optical plate 7 is fixed to and supported on the frame member 4 by means of an appropriate supporting structure.

Supporting pieces 11 are attached to, for example, the center points of the long sides of the optical sheets 5 and 6 and to the four corners thereof. One end of a resilient member 12 that is, for example, a helical tension spring is attached to each of the six supporting pieces 11.

The other ends of the resilient members 12 are, as shown in FIG. 7A, fixed to the center points of the long sides of the inner-surface of the frame member 4 and to the right and left points of the long sides. More particularly, tensile force is applied upward and downward.

Figure 5B:
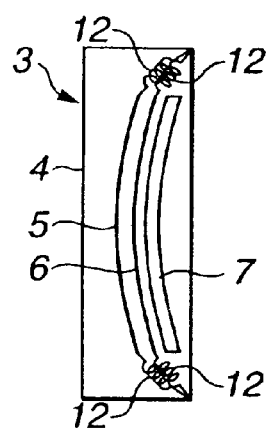

Moreover, the direction in which the optical sheets are layered is the same as the direction shown in FIG. 5B. The other ends of the resilient members 12 are fixed to the edges of the frame member 4 facing an observer, so that pressing forces exerted by both the optical sheets 5 and 6 will be oriented towards the optical plate 7.

As mentioned above, the optical plate 7 is designed to be laterally straight and to be perpendicularly curved like a cylindrical surface. As shown in FIG. 7A and FIG. 7B, when tensile force is applied upward and downward, the optical sheets are tensed in the perimetric direction of the cylindrical surface. With relatively weak force, the optical sheets 5 and 6 can be effectively brought into close contact with the optical plate 7.

In the example shown in FIG. 7A and FIG. 7B, tensile force is basically applied upward and downward. Alternatively, tensile force may also be applied right ward and leftward as auxiliary force.

Figure 8A:
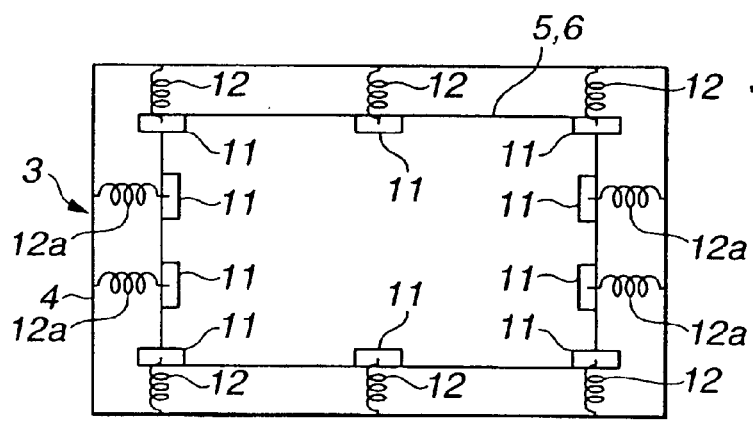
FIG. 8A and FIG. 8B are a front view and a side view showing a variant of the third example shown in FIG. 7.
Figure 8B:
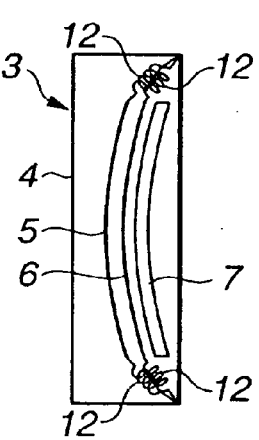

Specifically, like a variant shown in FIG. 8A and FIG. 8B, supporting pieces 11 may be attached to two central points on each right and left short sides of each of the optical sheets 5 and 6. One ends of resilient members 12a that are for example, helical tension springs and exert auxiliary tensile force, may be attached to the four supporting pieces 11.

The other ends of the resilient members 12a are fixed to two substantially central points on the short sides of the inner surface of the frame member 4. More particularly, tensile force is applied to the optical sheets rightward and leftward.

Owing to the structure, the magnitude of close contact of the optical sheets 5 and 6 with the optical plate 7 can be improved.

Next, referring to FIG. 9A and FIG. 9B, a description will be made on a fourth example of the structure for bringing the optical sheets 5 and 6 into close contact with the optical plate 7 by applying tensile force to the optical sheets.

As mentioned above, the optical plate 7 is fixed to and supported on the frame member 4 by means of an appropriate supporting structure.

Next, the optical sheets 5 and 6 have supporting pieces 11 attached to, for example, the center points of the short and long sides thereof and to the corners thereof. One end of a resilient member 12 that is, for example, a helical tension spring, is fixed to each of the eight supporting pieces 11.

Figure 9A:
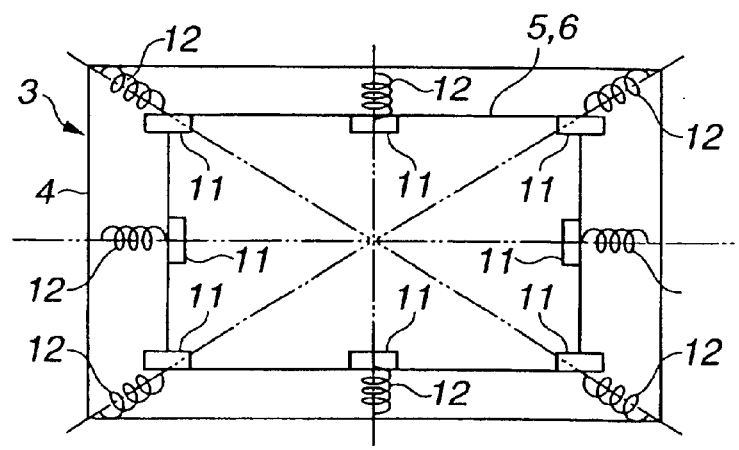
FIG. 9A and FIG. 9B are a front view and a side view showing a fourth example of the structure for resiliently supporting the optical sheets on the frame member employed in the embodiment.
Figure 9B:
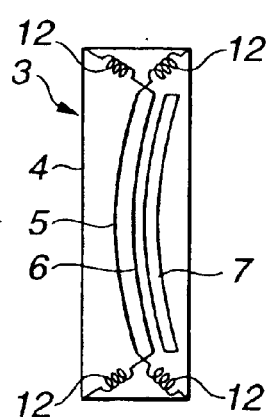

The other ends of the resilient members 12 are, as shown in FIG. 9A, fixed to the center points of the long and short sides of the inner surface of the frame member 4 and to the four corners thereof. More particularly, tensile force is applied in radial directions from the center of the optical sheets 5 and 6.

The direction in which the optical sheets are layered is the same as the one shown in FIG. 6B. As shown in FIG. 9B, the other ends of the resilient members 12 attached to the optical sheet 5 are fixed to the corners or edges of the frame member facing an observer so that pressing force will be oriented towards the optical plate 7. The other ends of the resilient members 12 attached to the optical sheet 6 are fixed to the corners or edges of the frame member facing the image projector 1 so that pressing force will be oriented towards the optical sheet 5. Incidentally, the magnitudes of constraining forces exerted by the resilient members 12 have the same relationship as the aforesaid one.

Figure 10:
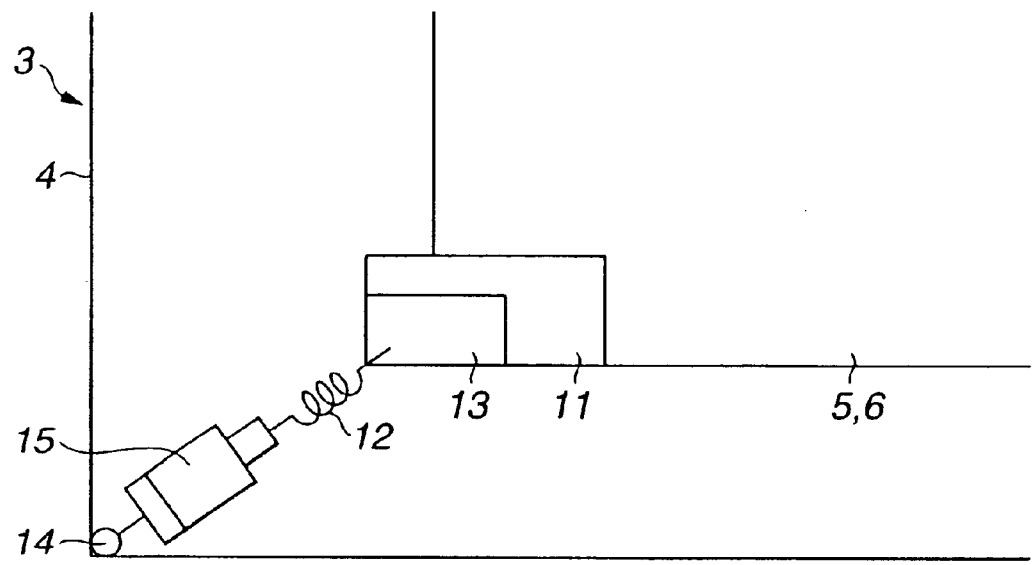
FIG. 10 is an enlarged front view showing the structures for resilient supporting the optical sheets on with frame member, which is employed in the embodiment, with a tension variation mechanism added thereto.
Figure 11:
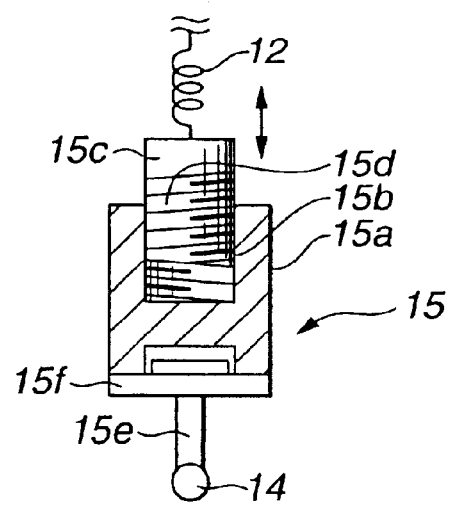
FIG. 11 is a sectional view showing the internal structure of the tension variation mechanism employed in the embodiment.
Figure 12:
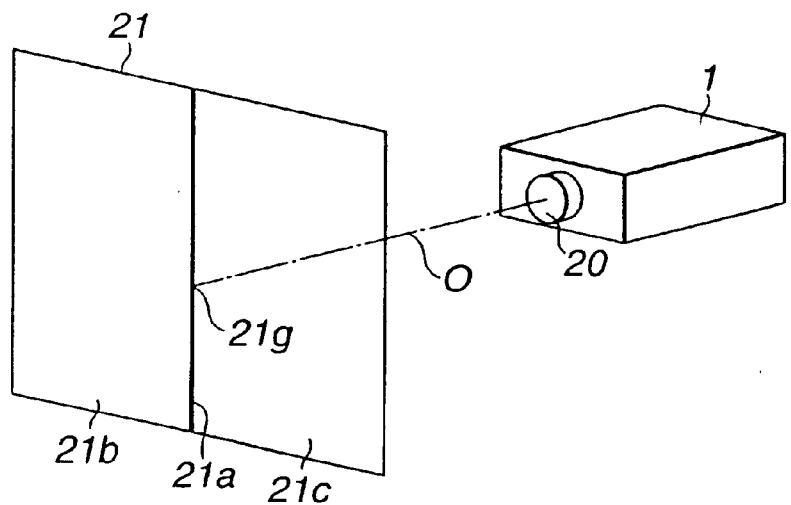
FIG. 12 is a perspective view showing an image forming system in accordance with the embodiment in which an image is projected from one image projector on an optical sheet that has one joint line.

FIG. 10 and FIG. 11 show examples of a structure including a tension variation mechanism that enables adjustment of tensile force exerted by each resilient member 12. The structure can be adapted to any of the examples shown in FIG. 5A to FIG. 9B.

The tension variation mechanism 15 serving as a tensile force adjusting means is interposed between, for example, each resilient member 12 and the frame member 4. One end of the tension variation mechanism 15 is fixed to each resilient member 12, and the other end thereof is fixed to the frame member 4 via a connector 14 that is a link mechanism or the like so that the other end thereof can pivot on the connector 14.

The tension variation mechanism 15 has, as shown in FIG. 11, a piston portion 15c thereof screwed to a cylinder portion 15a. The resilient member 12 is fixed to one end of the piston portion 15c, and a male screw 15d is threaded on the periphery thereof. A female screw 15b is threaded on the inner surface of the cylinder portion 15a. Tensile force to be exerted by the resilient member 12 is adjusted by changing the depth by which the piston portion is screwed to the cylinder portion 15a.

Moreover, a pin portion 15e having the connector 14 is fixed to a cover member 15f, and the cover member 15f is fixed to the other end of the cylinder portion 15a.

Owing to the structure, tensile force to be exerted by the resilient member 12 can be adjusted readily despite a difference from one product to another in the size of the optical sheets 5 and 6 or the position on the optical sheets 5 and 6 at which the resilient member 12 is attached.

Incidentally, the supporting pieces 11 attached to the, optical sheets 5 and 6 are formed with, for example, of acrylic chips. If the acrylic chip is not strong enough to withstand tensile force exerted by the resilient member 12, a reinforcing piece 13 made of, for example, metal, may be bonded to a portion of the supporting piece 11 to which the resilient member 12 is attached, as shown in FIG. 10.

As described in conjunction with FIG. 3A and FIG. 3B, when a joint line must not be visualized as a streak, the optical axis O of the projection optical system included in the image projector 1 should preferably intersect the joint line nearly perpendicularly.

This relationship between a joint line on the optical sheets and an image projector will be detailed with preference to FIG. 12 to FIG. 24.

FIG. 12 to FIG. 16 shows a case where an optical sheet 21 has one joint line 21a extended vertically and one image projector 1 projects an image on the optical sheet 21.

Specifically the optical sheet 21 is realized by joining two sheet members 21b and 21c with the margins thereof met as the joint line 21a.

The image projector 1 produces an image and projects the image on the optical sheet 21 through a projection optical system 20. The optical axis a of the projection optical system 20 intersects the joint line 21a at, for example, a nearly center point 21g.

The optical axis O is contained in a plane defined with the tangent vector (direction vector at the point 21g on the joint line 21a and the normal vector to the major surface of the optical sheet 21 at the point 21g.

Figure 13:
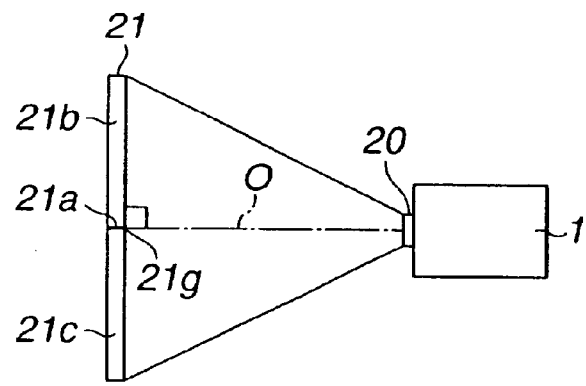
FIG. 13 is a plan view showing the image forming system in accordance with the embodiment in which an image is projected from one image projector on an optical sheet that has one joint line.

As shown in FIG. 13, when an image forming system composed of the optical sheet 21 and the image projector 1 is seen from above, the optical axis O of the projection optical system 20 intersects the joint line 21a perpendicularly to the major surface of the optical sheet 21. In contrast, when the image forming system is viewed from the side, the optical axis O of the projection optical system 20 may, as indicated with one dotted chain line in FIG. 14, intersect the joint line 21a perpendicularly to the major surface of the optical sheet 21. However, the present invention is not limited to this mode.

Figure 14:
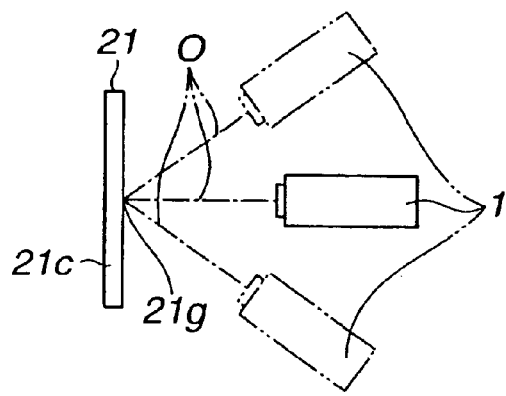
FIG. 14 is a side view showing the image forming system in accordance with the-embodiment in which an image is projected from one image projector on an optical sheet that has one joint line.

For example, as indicated with two dotted chain lines in FIG. 14, the image projector 1 may project an image on the major surface of the optical sheet 21 so that the optical axis O will meet the optical sheet 21 obliquely. Even in this case, a "streak" stemming from the joint line 21a will be indiscernible.

However, when an image is projected from above or below, that is, when projected light is deflected upward or downward relative to the optical axis O of the projection optical system 20, the optical axis O is almost always perpendicular to the major surface of the screen 21.

The reason why the optical sheet and image projector are arranged so that the optical axis O will intersect the joint line 21a perpendicularly to the optical sheet when the image forming system is seen from above will be described with reference to FIG. 15 and FIG. 16.

Figure 15:
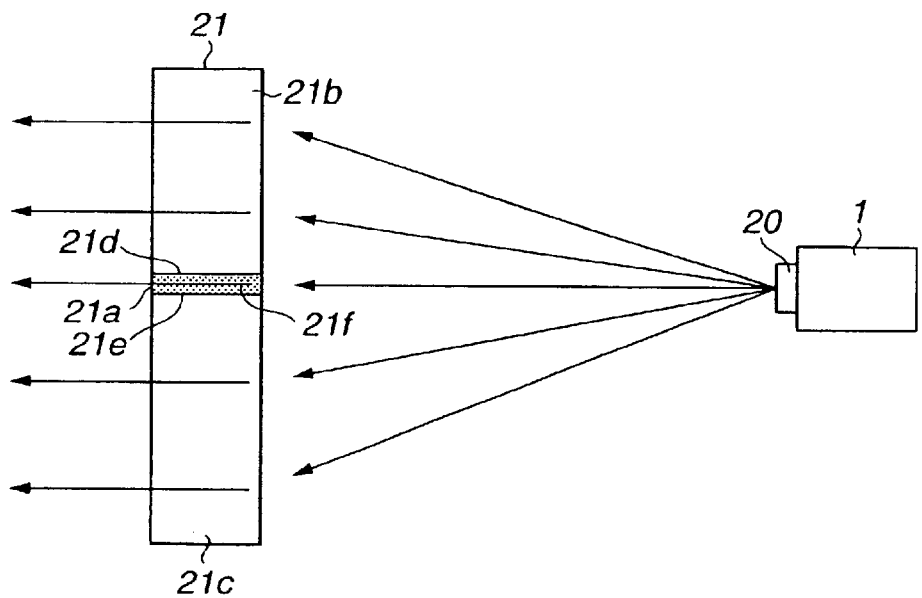
FIG. 15 is an enlarged plan view showing a desirable positional relationship between a joint line and rays projected from an image projector employed in the embodiment.
Figure 16:
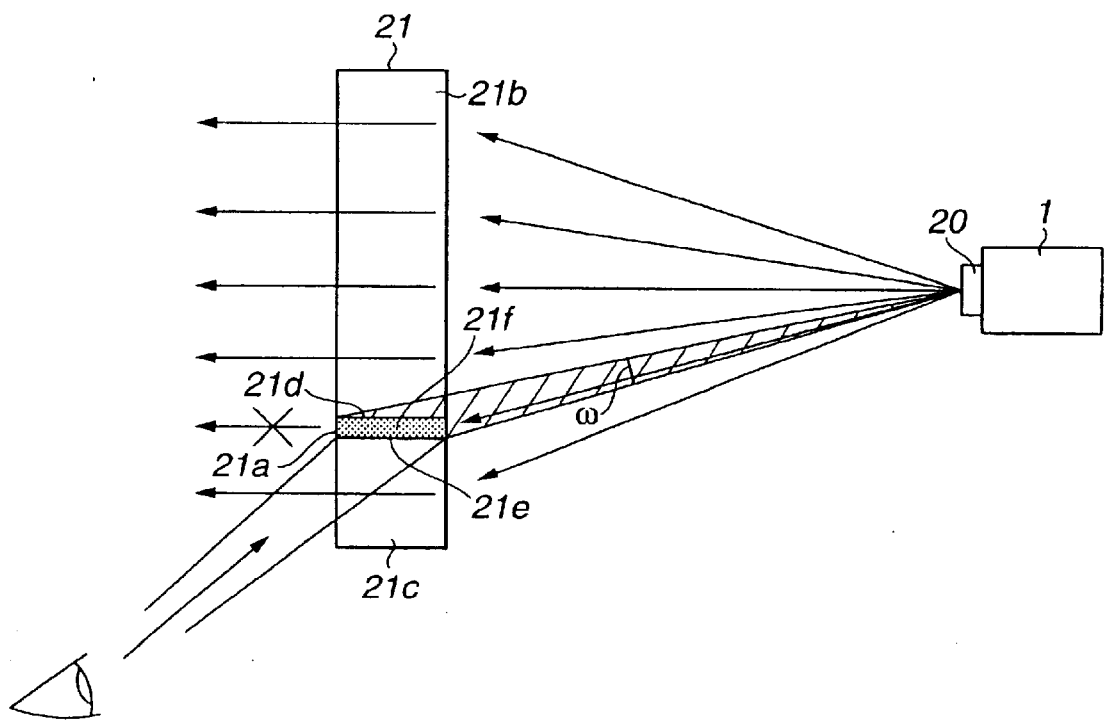
FIG. 16 is an enlarged plan view showing an undesirable positional relationship between a joint line and ray projected from an image projector employed in the embodiment.

When the joint line 21a is observed in enlargement, it is seen as shown in FIG. 15 or FIG. 16 that a joint surface 21d that is an end surface of the sheet member 21b substantially perpendicular to the major surface of the optical sheet and a joint surface 21e that is an end surface of the sheet member 21c substantially perpendicular to the major surface of the optical sheet are joined using, for example, an adhesive 21f. The adhesive 21f is made of a material whose refractive index is as close as possible to the refractive index of the material made into the sheet members 21b and 21c. Nevertheless, there is still difficulty in agreeing the optical property of one material with that of the other material. The optical property is therefore discontinues at the joint surfaces 21d and 21e.

Because of the above structure, when the optical axis O is contained in the aforesaid plane defined with a tangent vector and a normal vector, if the image forming system is seen from above, rays projected from the image projector 1 fall on the joint line 21a nearly perpendicularly. When the optical screen and image; projector are arranged this way, the solid angle formed with rays propagating from the projection optical system 20 and the joint surface 21d or 21e is approximately 0. Namely, nearly none of the rays falls on the joint surfaces 21d and 21e at which the optical property is discontinues. Consequently, reflection or scattering of light hardly occurs at the joint surfaces 21d and 21e.

Assume that the optical axis O is not contained on the aforesaid plane defined with a tangent vector and a normal vector. In this case, for example, as shown in FIG. 16, when the image forming system is seen from above, rays projected from the image projector 1 fall on the joint line 21a obliquely while forming a solid angle ω. At this time, the solid angle formed with rays propagating from the projection optical system 20 to the joint surface 21d or 21e is larger than the one shown in FIG. 15. Rays are irradiated to the joint surfaces 21d and 21e according to the solid angle. Consequently, reflection or scattering occurs on the joint surfaces 21d and 21e according to an amount of light.

Consequently, the joint line 21a is visualized as a "streak." In particular, when the optical sheet is seen from an oblique position, the joint line is visualized as a "streak with a certain width" because of the thickness of the sheet members 21b and 21c. The streak is therefore quite discernible.

In order to make a "streak" indiscernible, the optical sheet and image projector are arranged so that the optical axis O will be contained in the plane defined with a tangent vector and a normal vector.

Generally, when the optical sheet 21 has a unique portion whose optical property is unique (for example, discontinuous), such as, the joint surfaces, the image projector 1 should be positioned so as to minimize the solid angle formed with rays propagating from the projection optical system 20 included in the image projector 1 and the surface of the unique portion. When the image projector 1 is separated infinitely away from the optical sheet 21, the solid angle approaches 0. In terms of minimizing the solid angle, the solid angle should not be minimized without restriction but rather the solid angle should be minimized under a restriction that the image projector 1 and optical sheet 21 maintain a predetermined positional relationship. The restriction is a condition that the image projector 1 must be positioned at a predetermined distance from the major surface of the optical sheet 21 according to a focal distance offered by the projection optical system 20, or a condition that offsetting must be performed within a range permissible in terms of design. Moreover, the unique portion is not limited to the joint surfaces but refers to a wide range of optically unique portions including a portion of the optical sheet 21 that contains a flaw.

Figure 17:
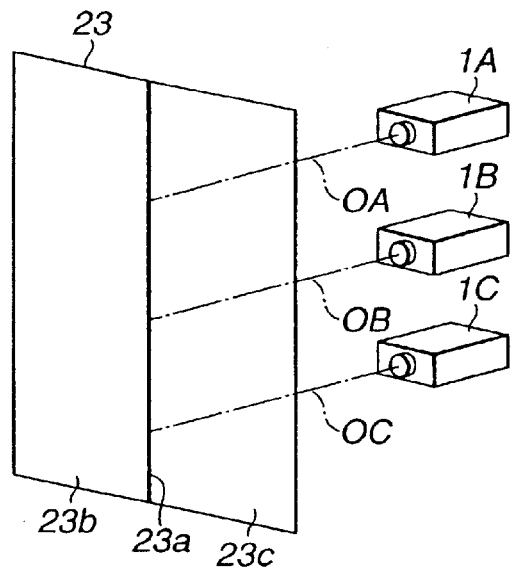
FIG. 17 is a perspective view showing an image forming system in accordance with the embodiment in which images are projected from three image projectors on an optical sheet that has one joint line.
Figure 18:
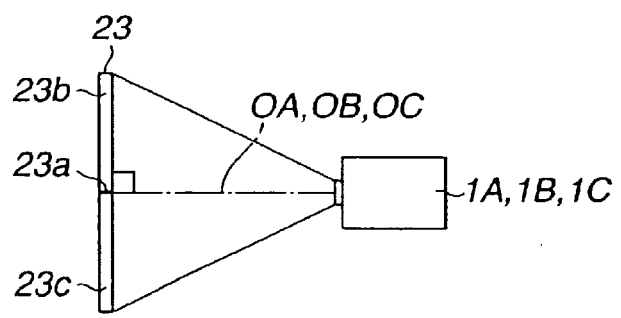
FIG. 18 is a plan view showing the image forming system in accordance with the embodiment in which images are projected from three image projector on an optical sheet that has one joint line.
Figure 19:
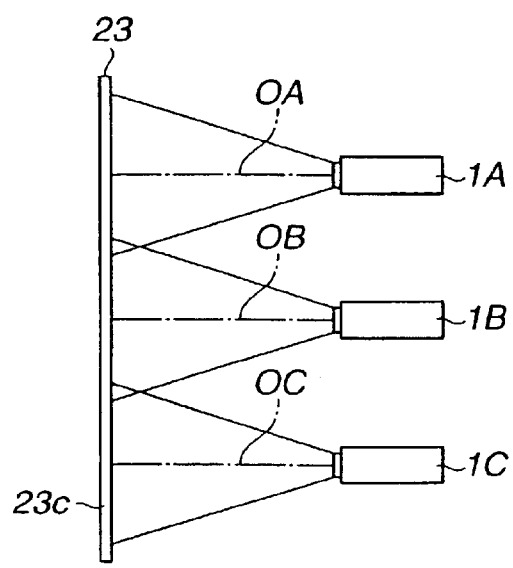
FIG. 19 is a side view showing the image forming system in accordance with the embodiment in which images are projected from three image projectors on an optical sheet that has one joint line.

Next, referring to FIG. 17 to FIG. 19, a description will be made on a case where an optical sheet 23 has one joint line 23a extended vertically and three image projectors 1A, 1B, and 1C project images on the optical sheet 23.

The optical sheet 23 is realized by joining two sheet members 23b and 23c, which are lengthwise long, with the margins of the long sides thereof met as the joint line 23a.

The image projectors 1A, 1B, and 1C are arranged vertically nearly equidistantly. The optical axes OA, OB, and OC of the image projectors nearly perpendicularly intersect the joint line 23a at different points. When the optical sheet and image projectors are seen from above, the optical axes intersect, as shown in FIG. 18, the joint line nearly perpendicularly thereto. When the optical sheet and image projectors are viewed from the sides, the optical axes intersect, as shown in FIG. 19 the joint line nearly perpendicularly thereto.

However, each of the optical axes OA, OB, and OC should merely be contained on a plane defined with the tangent vector (direction vector) at a point at which the optical axis intersects the joint line 23a, and the normal vector to the major surface of the optical sheet 21 at the point. Therefore, when the optical sheet and projectors are viewed from the sides, the optical axes need not be perpendicular to the joint line as shown in FIG. 19.

Moreover, each of the image projectors 1A, 1B, and 1C produce a part of an image and project it so that the margins of adjoining ones of the parts of an image will be superposed on each other. The partial images are joined smoothly, thus forming no streaked image.

Next, referring to FIG. 20 and FIG. 21, a description will be made on a case where an optical sheet 25 has three joint lines extended vertically and images are projected from nine image projectors arranged in the form of a lattice on the optical sheet 25.

The optical sheet 25 is realized by joining four sheet members 25d, 25e, 25f, and 25g with the margins thereof met as joint lines 25a, 25b, and 25c.

Moreover, image projectors 1D, 1E, 1F, 1G, 1H, 1I, 1J, 1K, and 1L are arranged in three rows and three columns in the form of a lattice.

To be more specific, the optical axes OD, OE, and OF of the image projectors 1D, 1E, and 1F nearly perpendicularly intersect the joint line 25a at different points. The optical axes OG, OH, and OI of the image projectors 1G, 1H, and 1I nearly perpendicularly intersect the joint line 25b at different points. The optical axes OJ, OK, and OL of the image projectors 1J, 1K, and 1L nearly perpendicularly intersect the joint line 25c at different points.

Figure 21:
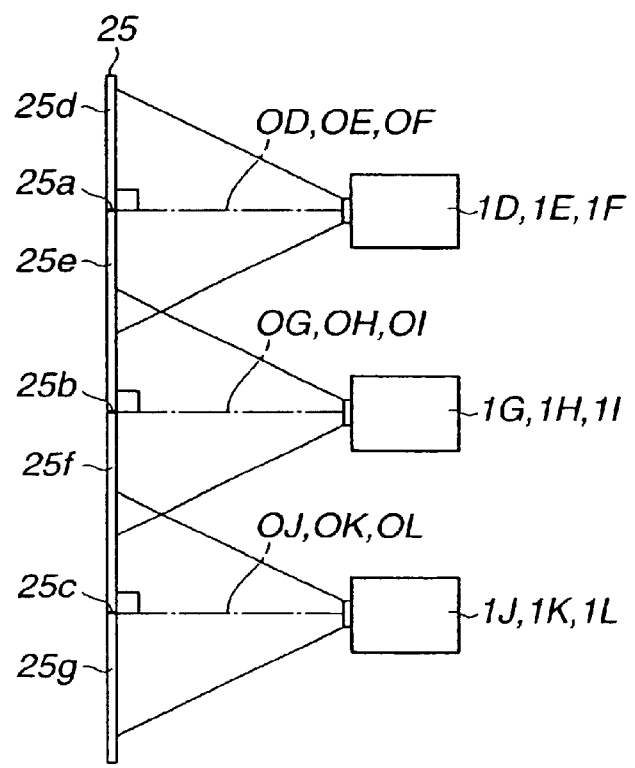
FIG. 21 is a plan view showing the image forming system in accordance with the embodiment in which images are projected from nine image projectors on an optical sheet that has three parallel joint lines.

At this time, as mentioned above, when the optical sheet and image projectors are viewed from above, the optical axes intersect the joint lines nearly perpendicularly as shown in FIG. 21. When the optical sheet and image projectors are viewed from the sides the optical axes need not always intersect the joint lines nearly perpendicularly.

Moreover, as mentioned above, adjoining ones of the margins of partial images projected on the optical sheet 25 from the image projectors 1D, 1E, 1F, 1G, 1H, 1I, 1J, 1K, and 1L superpose on each other.

Next, referring to FIG. 22 to FIG. 24, a description will be made on of case where an optical sheet 27 has six joint lines extended vertically and four joint lines extended laterally, and images are projected from nine image projectors arranged in the form of a lattice on the optical sheet 23.

The optical sheet 27 is realized by joining eight sheet members 27k, 27l, 27m, 27n, 27o, 27p, 27q, and 27r with the margins of adjoining sheet members met to form joint lines.

To be more specific, the sheet member 27k and sheet member 27l are joined to form the joint line 27a. The sheet member 27l and sheet member 27m are joined to form the joint line 27b. The sheet member 27m and sheet member 27n are joined to form the joint line 27c. The sheet member 27k and sheet member 27o are joined to form the joint line 27d. The sheet member 27l and sheet member 27p are joined to form the joint line 27e. The sheet member 27m and sheet member 27q are joined to form the joint line 27f. The sheet member 27n and sheet member 27r are joined to form the joint line 27g. The sheet member 27o and sheet member 27p are joined to form the joint line 27h. The sheet member 27p and sheet member 27q are joined to form the joint line 27i. The sheet member 27q and sheet member 27r are joined to form the joint line 27j.

Figure 20:
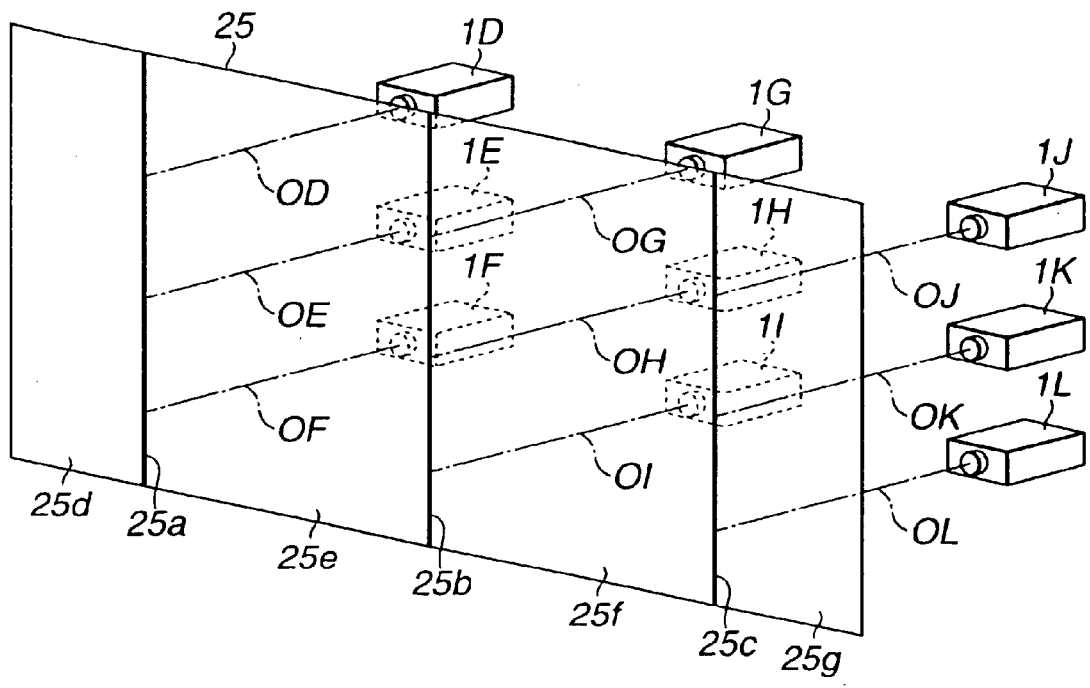
FIG. 20 is a perspective view showing an image forming system in accordance with the embodiment in which images are projected from nine image projectors arranged in the form of a lattice on an optical sheet that has three parallel joint lines.

Moreover, the image projectors 1M, 1N, 1O, 1P, 1Q, 1R, 1S, 1T, and 1U are, similarly to the ones shown in FIG. 20 and FIG. 21, arranged in three rows and three columns in the form of a lattice.

In other words, the optical axes OM and ON of the image projectors 1M and 1N nearly perpendicularly intersect the joint line 27a at different points. The optical axes OP and OQ of the image projectors 1P and 1Q nearly perpendicularly intersect the joint line 27b at different points. The optical axes OS and TO of the image projectors 1S and 1T nearly perpendicularly intersect the joint line 27c a different points.

Moreover, the optical axis OO of the image projector 1O nearly perpendicularly intersects the joint lines 27a, 27d, 27e, and 27h at a point that corresponds to a node 27s at which the joint lines 27a, 27d, 27e, and 27h converge. The optical axis OR of the image projector 1R nearly perpendicularly intersects the joint lines 27b, 27e, 27f, and 27i at a point that corresponds to a node 27t at which the joint lines 27c, 27f, 27g and 27j converge. The optical axis OU of the image projector 1U nearly perpendicularly intersects the joint lines 27c, 27f, 27g, and 27j at a point that corresponds to a node 27u at which the joint lines 27c, 27f, 27g, and 27j converge.

Specifically, when the image projectors 1M, 1N, 1P, 1Q, 1S, and 1T are seen from above, the optical axes OM, ON, OP, OQ, OS, and OT merely intersect the associated joint lines nearly perpendicularly. When the image projectors 1O, 1R, and 1U are seen from both above and side (see FIG. 23), the optical axes OO, OR, and OU thereof must meet the nodes 27s, 27t, and 27u nearly perpendicularly.

When the image projectors are positioned as mentioned above, as shown in FIG. 24, not only vertically adjoining ones of partial images projected from the image projectors overlap to have fields thereof superposed on each other but also laterally adjoining ones of the partial images overlap have fields thereof superposed on each other. Moreover, one of the partial images overlap upper, and right, and left adjoining partial images to have four fields thereof superposed on respective adjoining fields.

Figure 22:
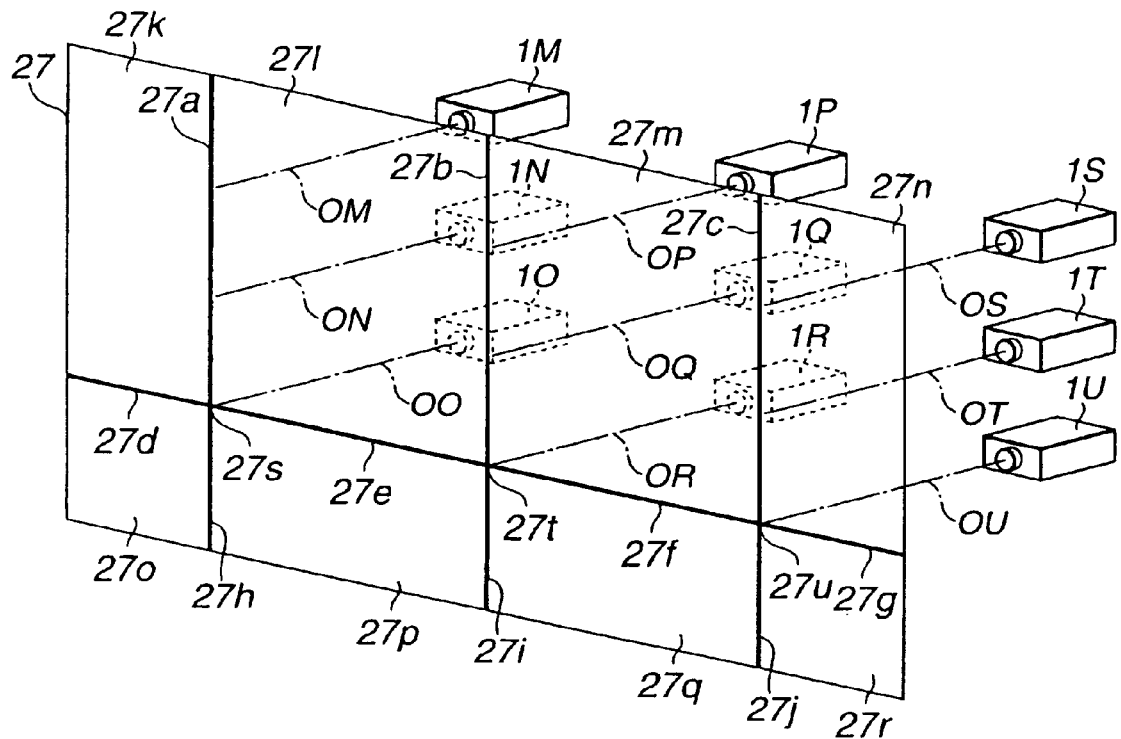
FIG. 22 is a perspective view showing an image forming system in accordance with the embodiment in which images are projected from nine image projectors, which are arranged in the form of a lattice, on an optical sheet that has six joint lines extended vertically and four joint lines extended laterally.
Figure 23:
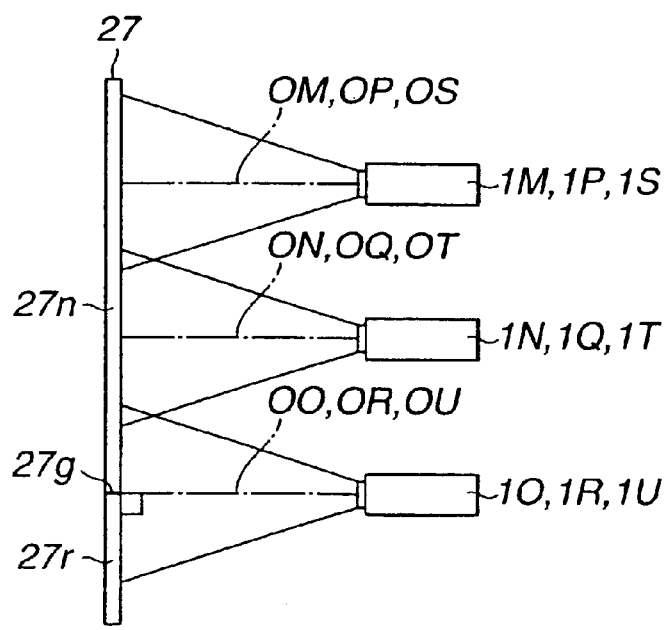
FIG. 23 is a view showing an image forming system in accordance with the embodiment in which images are projected from nine image projectors, which are arranged in the form of a lattice, on an optical sheet that has six joint lines extended vertically and four joint lines extended laterally.
Figure 24:
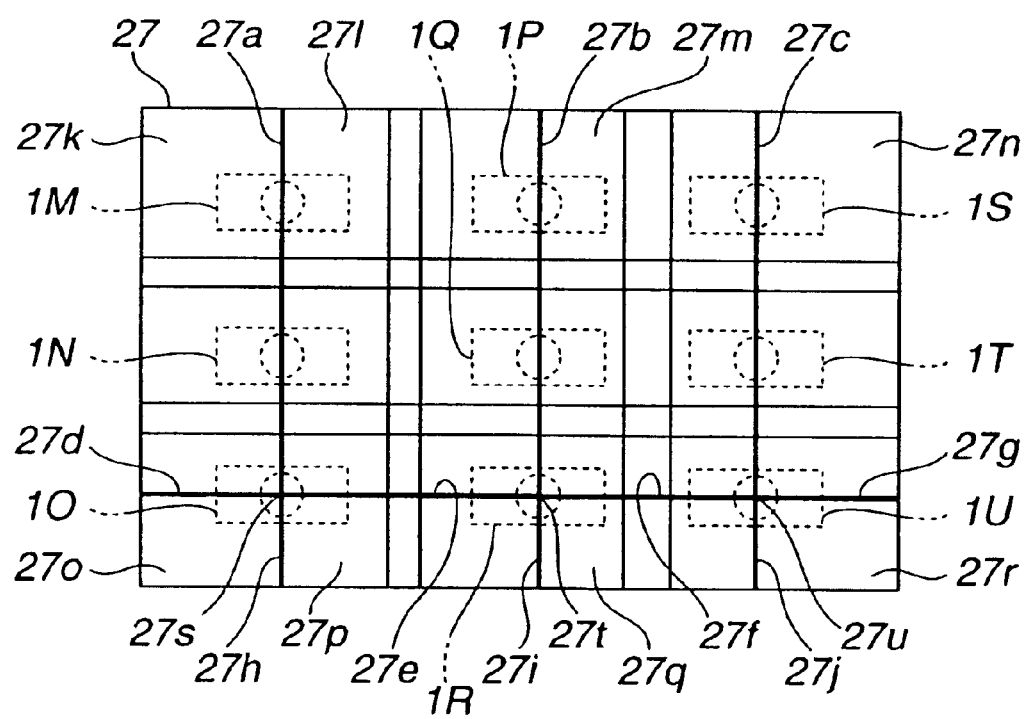
FIG. 24 is a front view showing an arrangement of partial images projected from nine, image projectors, which are arranged in the form of a lattice, on an optical sheet that has six joint lines extended vertically and four joint lines extended laterally.

Moreover, in the case shown in FIG. 22 to FIG. 24, joint lines meet orthogonally at a node to draw a cross. The present invention is not limited to this mode. The aforesaid arrangement is adaptable to a case where joint lines meet at a node to draw a letter T or three or more joint lines meet at any angle. The optical axis meeting a node must have the same direction as the direction of the formal vector to the major surface of the optical sheet at the node.

The aforesaid arrangements is adaptable to a case where the optical sheet is a curved plane, for example, a cylindrical plane or a spherical plane. Moreover, the optical sheet is, realized in practice with, for example, an optical sheet having numerous beads arranged on a planar basis, an optical sheet formed as a Fresnel lens, an optical sheet formed with lenticular lens sheet, or an optical sheet having the capability of a diffusing sheet. The aforesaid arrangement can be adapted to any of these optical sheets.

Furthermore, when a plurality of optical sheets overlaps one another to construct an optical screen, the joint lines among the optical sheets should have the aforesaid relationships to the optical axes of image projectors.

The arrangements described with reference to FIG. 12 to FIG. 24 are not limited to a case where optical sheets ate brought into close contact with an optical plate in order to construct an optical screen. The arrangements ate widely adopted in various cases where an optical sheet having a joint line is employed, such as, a case where optical screen is constructed using a sole optical sheet.

In addition, in an image forming system put to practical use, one or more mirrors or the, like may be interposed between an image projector and an optical screen in order to angle luminous flux projected from the image projector. Even in this case, light finally falling on optical sheets constituting the optical screen should satisfy the aforesaid relationship.

In the present embodiment, when an optical sheet has sheet members joined, an image projector and the optical sheet are arranged so that the optical axis of the image projector will intersect a joint line in the optical sheet. At this time, the optical axis is contained in a plane defined with the normal vector to the major surface of the optical sheet at the intersection, and the tangent vector to the joint line at the intersection. Consequently, a large-screen image forming system whose joint line is substantially invisible can realized.

Furthermore, an optical member such as a diffusing plate is adopted as an optical plate having predetermined rigidity and curved so that the optical plate will have a predetermined curved surface. Tensile force is applied to optical sheets realized with lenticular lens sheets or the like, whereby the optical sheets are pressed against the optical plate and brought into close contact therewith. Consequently, even if the optical plate is designed to have a diffusing surface in order to offer a wide field of view, an image formed on the optical sheets will not be blurred.

The optical sheets are tensed using resilient members. Even if the optical sheets stretch or contract due to a change in ambient temperature or humidity, the change can be coped with flexibly.

Moreover, the surface of the optical plate on the side of a frame member facing an observer may be processed to become anti-glare or anti-reflection.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image forming system comprising:
   an optical sheet having a plurality of sheet members joined such that margins of adjoining sheet members meet to form respective joint lines and one or more nodes at each of which joint lines converge, said sheet members being substantially planar; and
   one or more image projectors each producing part of an image and projecting the part of the image to said optical sheet through a projection optical system,
   wherein one image projector corresponds to each of the one or more nodes, and
   wherein an image projector corresponding to a node is positioned so that an optical axis of a projection optical system included in the image projector will meet the node while fitting a normal on a major surface of said optical sheet at the node.

2. The image forming system according to claim 1, wherein at least one node is formed by convergence of four joint lines that are orthogonal to one another in the form of a cross or three joint lines that are orthogonal to one another in the form of a letter T.

3. The image forming system according to claim 1, further comprising one or more image projectors corresponding to any points on the joint lines other than the nodes, wherein the image projectors corresponding to any points on the joint lines other than the nodes are positioned so that optical axes of projection optical systems included in the image projectors will be contained in planes defined with the normal on the major surface of said optical sheet at the points on the joint lines, and the joint lines.

4. An image forming system comprising:
   an optical sheet having two sheet members joined with margins of the sheet members meeting to form a joint line, said sheet members being substantially planar; and
   a plurality of image projectors each producing a part of an image and projecting the part of an image to said optical sheet through a projection optical sheet,
   wherein optical axes of said plurality of image projectors are contained in planes defined by the joint line and a normal on a major surface of said optical sheet.

5. An image forming system comprising:
   an optical sheet having three or more sheet members joined such that margins of adjoining sheet members meet to form two or more mutually parallel joint lines, said sheet members being substantially planar; and
   a plurality of image projectors each producing part of an image and protecting the part of an image to said optical sheet through a projection optical system,
   wherein one or more image projectors are opposed to each of the two or more joint lines, and
   wherein said image projectors are positioned so that optical axes thereof will be contained in planes defined with the corresponding joint lines and a normal on a major surface of said optical sheet respectively.

6. An image forming system comprising:
   an optical sheet having at least one portion whose optical property is discontinuous with the rest of the optical sheet; and
   an image projector for projecting an image to said optical sheet through a projection optical system,
   wherein said image projector is positioned so that a solid angle formed with rays propagating from the projection optical system to the at least one portion is minimized under a restriction on a predetermined positional relationship to said optical sheet;
   wherein said restriction comprises one of a first condition that the image projector is positioned at a predetermined distance from a major surface of the optical sheet according to a focal distance offered by the projection optical system, and a second condition that offsetting is performed within a permissible range.

* * * * *